United States Patent
Wilson et al.

(10) Patent No.: US 10,227,707 B2
(45) Date of Patent: Mar. 12, 2019

(54) INERT ANODE ELECTROPLATING PROCESSOR AND REPLENISHER

(71) Applicant: APPLIED Materials, Inc., Santa Clara, CA (US)

(72) Inventors: Gregory J. Wilson, Kalispell, MT (US); Paul R. McHugh, Kalispell, MT (US); John L. Klocke, Kalispell, MT (US)

(73) Assignee: Applied Materials, Inc., Santa Clara, CA (US)

( * ) Notice: Subject to any disclaimer, the term of this patent is extended or adjusted under 35 U.S.C. 154(b) by 540 days.

(21) Appl. No.: 14/802,859

(22) Filed: Jul. 17, 2015

(65) Prior Publication Data
US 2017/0016137 A1    Jan. 19, 2017

(51) Int. Cl.
| | |
|---|---|
| C25B 15/08 | (2006.01) |
| C25B 15/02 | (2006.01) |
| C25B 9/08 | (2006.01) |
| C25B 9/18 | (2006.01) |
| C25B 1/02 | (2006.01) |
| C25D 21/18 | (2006.01) |
| C25D 7/12 | (2006.01) |
| C25D 17/10 | (2006.01) |
| C25D 17/00 | (2006.01) |
| C25D 17/06 | (2006.01) |
| C25D 3/38 | (2006.01) |

(52) U.S. Cl.
CPC ............. *C25D 21/18* (2013.01); *C25D 7/123* (2013.01); *C25D 17/001* (2013.01); *C25D 17/002* (2013.01); *C25D 17/06* (2013.01); *C25D 17/10* (2013.01); *C25D 3/38* (2013.01); *Y02E 60/366* (2013.01)

(58) Field of Classification Search
CPC ........... C25B 15/08; C25B 15/02; C25B 9/08; C25B 9/18; C25B 1/02
USPC ......................................................... 204/232
See application file for complete search history.

(56) References Cited

U.S. PATENT DOCUMENTS

| | | |
|---|---|---|
| 8,496,789 B2 | 7/2013 | McHugh et al. |
| 8,496,790 B2 | 7/2013 | Wilson et al. |
| 8,808,888 B2 | 8/2014 | Wilson et al. |
| 9,017,528 B2 | 4/2015 | Papapanayiotou |

(Continued)

FOREIGN PATENT DOCUMENTS

CN    103608490 A    2/2014

OTHER PUBLICATIONS

ISA/KR, International Application Division, Korean Intellectual Property Office, "The International Search Report and the Written Opinion" issued in International application No. PCT/US2016/040988 (dated Oct. 12, 2016).

(Continued)

*Primary Examiner* — Zulmariam Mendez
(74) *Attorney, Agent, or Firm* — Perkins Coie LLP; Kenneth H. Ohriner

(57) ABSTRACT

An electroplating processor has a vessel holding an electrolyte. An inert anode in the vessel has an anode wire within an anode membrane tube. A head for holds a wafer in contact with the electrolyte in the vessel. The wafer is connected to a cathode. A catholyte replenisher is connected to the vessel. The catholyte replenisher adds metal ions into the catholyte by moving ions of a bulk metal through a catholyte membrane in the catholyte replenisher.

9 Claims, 9 Drawing Sheets

(56) References Cited

U.S. PATENT DOCUMENTS

| | | |
|---|---|---|
| 2001/0020583 A1 | 9/2001 | Woodruff et al. |
| 2003/0000842 A1 | 1/2003 | Matejat et al. |
| 2003/0150736 A1 | 8/2003 | Kovarsky |
| 2005/0145499 A1* | 7/2005 | Kovarsky ................ C25D 5/18 205/103 |
| 2006/0157355 A1 | 7/2006 | Baskaran et al. |
| 2006/0189129 A1 | 8/2006 | Baskaran et al. |
| 2007/0261964 A1 | 11/2007 | Wilson et al. |
| 2009/0050478 A1* | 2/2009 | Kendig ................ G01N 17/02 204/404 |
| 2012/0138471 A1 | 6/2012 | Mayer et al. |
| 2012/0292181 A1* | 11/2012 | McHugh ............ C25D 17/008 204/260 |
| 2012/0298502 A1 | 11/2012 | Papapanayiotou et al. |
| 2012/0298504 A1 | 11/2012 | Guarnaccia et al. |
| 2013/0168254 A1 | 7/2013 | Mitzel et al. |
| 2014/0158545 A1 | 6/2014 | Schäfer et al. |
| 2014/0183049 A1 | 7/2014 | Mayer et al. |
| 2015/0008133 A1 | 1/2015 | Papapanayiotou et al. |
| 2015/0041327 A1 | 2/2015 | Buckalew et al. |

OTHER PUBLICATIONS

State Intellectual Property Office, First Office Action for Chinese Application No. 201610562582.1; dated Nov. 26, 2018; 15 pages.

* cited by examiner

Plumbing for recirculation of common catholyte.
No. recirculation for idle state.

1

INERT ANODE ELECTROPLATING PROCESSOR AND REPLENISHER

BACKGROUND OF THE INVENTION

Manufacture of semiconductor integrated circuits and other micro-scale devices typically requires formation of multiple metal layers on a wafer or other substrate. By electroplating metals layers in combination with other steps, patterned metal layers forming the micro-scale devices are created.

Electroplating is performed in an electroplating processor with the device side of the wafer in a bath of liquid electrolyte, and with electrical contacts on a contact ring touching a conductive layer on the wafer surface. Electrical current is passed through the electrolyte and the conductive layer. Metal ions in the electrolyte plate out onto the wafer, creating a metal layer on the wafer.

Electroplating processors typically have consumable anodes, which are beneficial for bath stability and cost of ownership. For example, it is common to use copper consumable anodes when plating copper. The copper ions taken out of the plating bath are replenished by the copper coming off of the anodes, thus maintaining the metal concentration in the plating bath. This is a very cost effective way to maintain the metal ions in the bath compared to replacing the electrolyte bath in a bleed and feed scheme. However, using consumable anodes requires a relatively complex and costly design to allow the consumable anodes to be replaced. Even more complexity is added when consumable anodes are combined with a membrane (for example a cation membrane) to avoid degrading the electrolyte, or oxidizing the consumable anodes during idle state operation, and for other reasons.

Such systems require many mechanical parts for seals and membrane supports. Electroplating processors using inert anodes have been proposed as an alternative to using a consumable anode. An inert anode reactor holds promise to reduce chamber complexity, cost, and maintenance. However, use of inert anodes has led to other disadvantages, especially related to maintaining the metal ion concentration in a cost effective manner compared to consumable anodes and the generation of gas at the inert anode which can cause defects on the workpiece. Accordingly, engineering challenges remain to providing an inert anode electroplating processor.

SUMMARY OF THE INVENTION

In one aspect, an electroplating processor has a vessel holding a vessel-catholyte (electrolyte liquid). An inert anode in the vessel has an anode wire within an anode membrane tube. A head holds a wafer in contact with the vessel-catholyte. The wafer is connected to a cathode. A vessel-catholyte replenisher is connected via return and supply lines to the vessel to circulate vessel-catholyte through the vessel and the vessel-catholyte replenisher. The vessel-catholyte replenisher adds metal ions into the vessel-catholyte by moving ions of a bulk metal through a catholyte membrane in the vessel-catholyte replenisher. Alternatively, the vessel-catholyte replenisher may add metal ions directly into the vessel-catholyte, without using a catholyte membrane.

DETAILED DESCRIPTION OF THE DRAWINGS

Figure 1:
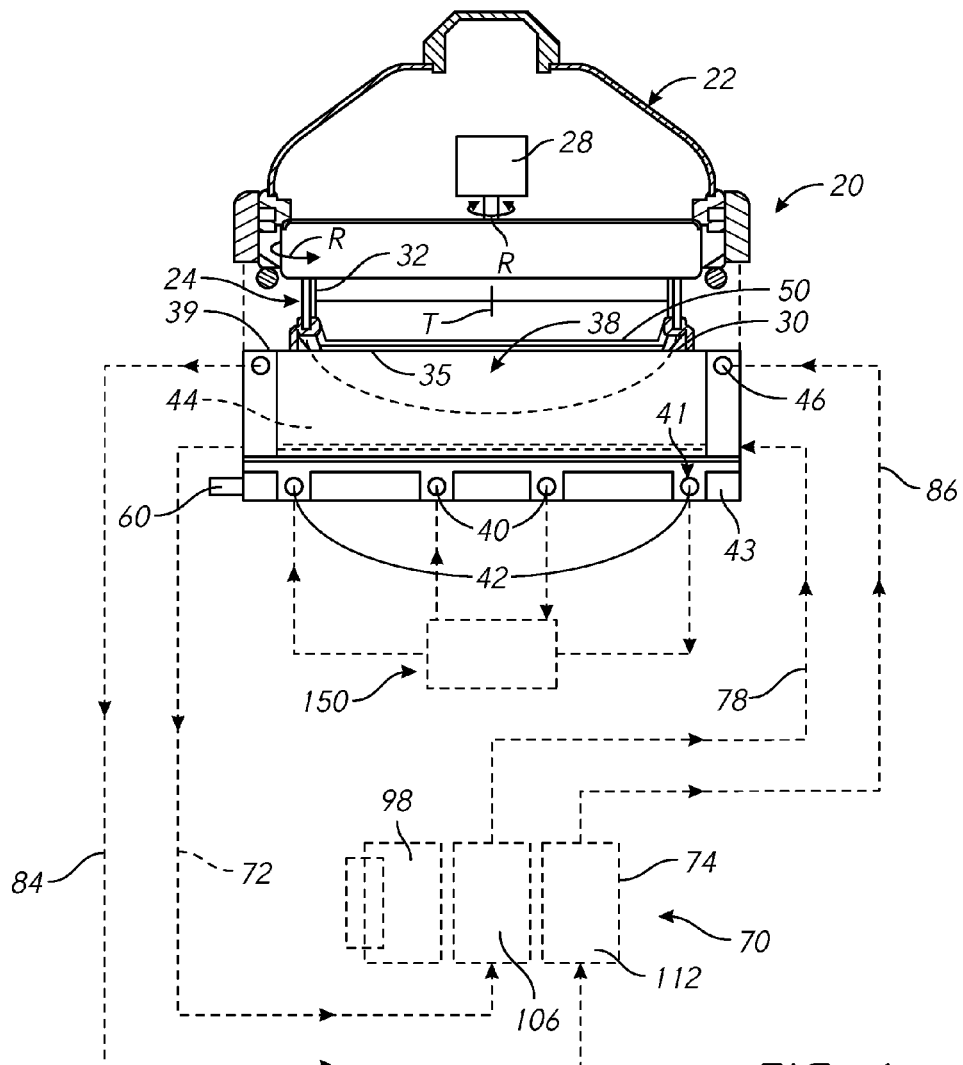
FIG. 1 is a schematic drawing of an electroplating processing system using inert anodes.

In FIG. 1, an electroplating processor 20 has a rotor 24 in a head 22 for holding a wafer 50. The rotor 24 has a contact ring 30 which may move vertically to engage contact fingers 35 on the contact ring 30 onto the down facing surface of a wafer 50. The contact fingers 35 are connected to a negative voltage source during electroplating. A bellows 32 may be used to seal internal components of the head 22. A motor 28 in the head rotates the wafer 50 held in the contact ring 30 during electroplating. The processor 20 may alternatively have various other types of head 22. For example the head 22 may operate with a wafer 50 held in a chuck rather than handling the wafer 50 directly, or the rotor and motor may be omitted with the wafer held stationery during electroplating. A seal on the contact ring seals against the wafer to seal the contact fingers 35 away from the catholyte during processing.

The head 22 is positioned over an electroplating vessel 38 of the electroplating processor 20. One or more inert anodes are provided in the vessel 38. In the example shown, the electroplating processor 20 has an inner anode 40 and an outer anode 42. Multiple electroplating processors 20 may be provided in columns within an electroplating system, with one or more robots moving wafers in the system.

Figure 2:
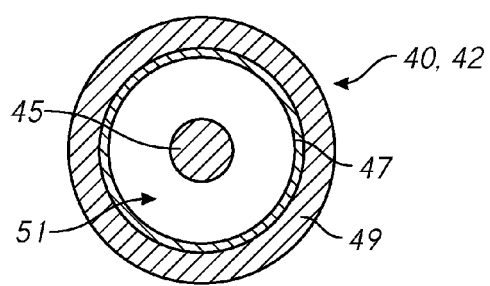
FIG. 2 is a cross section view of an anode as shown in FIG. 1.

In FIG. 2 the anodes 40 and 42 have a wire 45 within a membrane tube 47. The membrane tube 47 may have an outer protective sleeve or covering 49. The membrane tube 47 (including the electrode wire) may be circular, or optionally formed into a spiral, or linear arrays, or take another form appropriate to create the electric field adapted for the workpiece being processed. The wire 45 may be a 0.5 to 2 mm diameter platinum wire within a 2-3 mm inside diameter membrane tube 47. The wire 45 may also be a platinum clad wire with an interior core of another metal such as niobium, nickel, or copper. A resistive diffuser may be provided in the vessel above the inert anodes.

A flow space 51 is provided around the wire 45 within the membrane tube 47. Although the wire 45 may be nominally centered within the membrane tube 47, in practice the position of the wire within the membrane tube will vary, to the extent that the wire may be touching the inside wall of the membrane tube, at some locations. No spacers or other techniques to center the wire within the membrane tube are needed.

Figure 3:
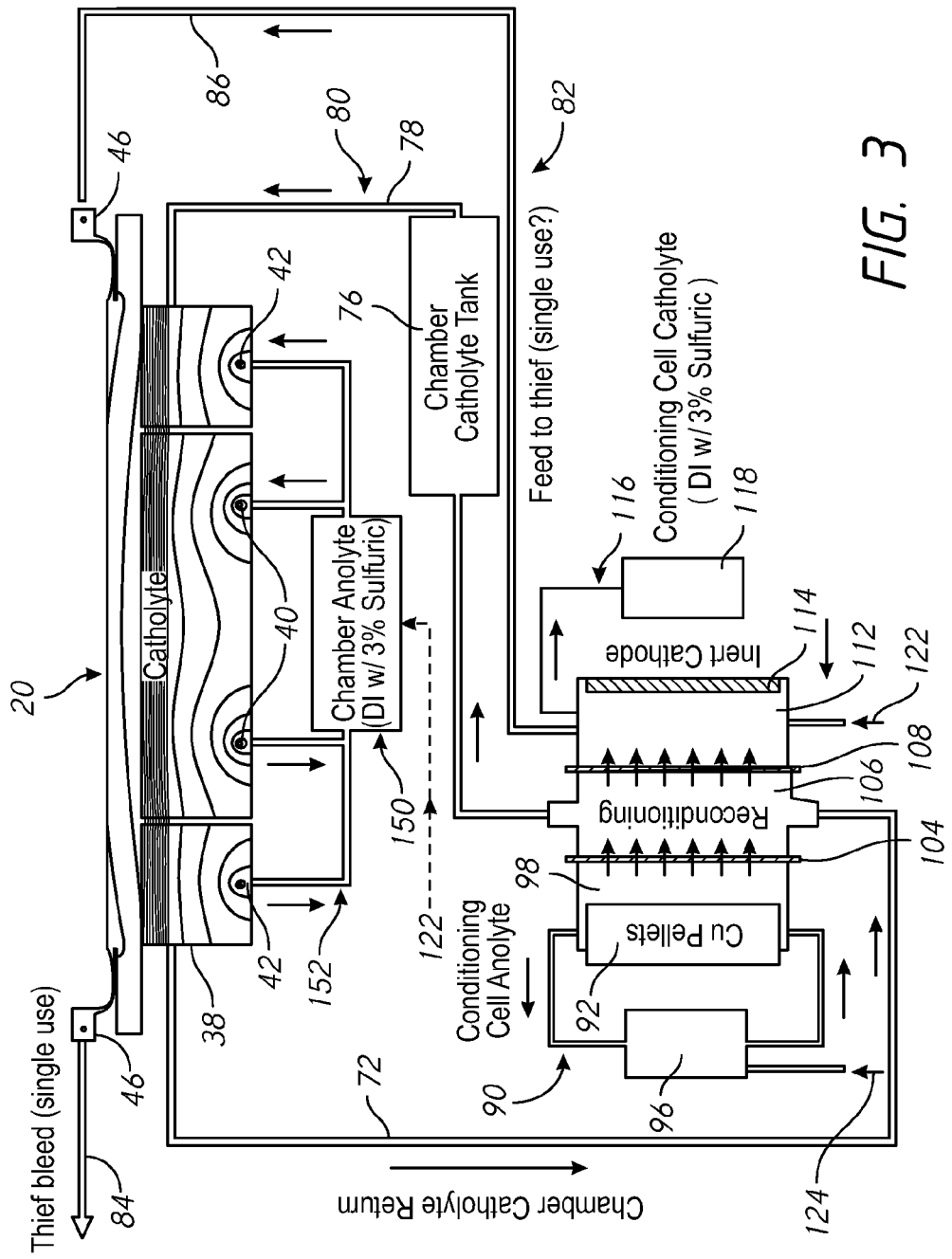
FIG. 3 is a schematic drawing of the vessel-catholyte replenishing system shown in FIG. 1.

Referring to FIG. 3, in a three-compartment replenisher 70, during electroplating, process anolyte is pumped through a process anolyte loop 152 which includes the anode membrane tubes 47 and a process anolyte chamber 150 which is a process anolyte source to the anodes 40 and 42. The membrane tubes forming the anodes 40 and 42 may be formed into a ring or circle, contained within a circular slot 41 in an anode plate 43 of the vessel 38, as shown in FIG. 1, i.e., with the membrane tubes resting on the floor of the vessel 38. The replenisher 70 is external to the processor 20 in that it is a separate unit which may be located remote from the processor, within a processing system.

The wire 45 of each anode 40, 42 is electrically connected to a positive voltage source (relative to the voltage applied to the wafer) to create an electric field within the vessel. Each of the inert anodes may be connected to one electrical power supply channel, or they may be connected to separate electrical power supply channels, via an electrical connector 60 on the vessel 38. One to four inert anodes may typically be used. The anolyte flow through the membrane tubes carries the gas out of the vessel. In use, the voltage source induces an electric current flow causing conversion of water at the inert anode into oxygen gas and hydrogen ions and the deposition of copper ions from the vessel-catholyte onto the wafer.

The wire 45 in the anodes 40 and 42 is inert and does not react chemically with the anolyte. The wafer 50, or a conductive seed layer on the wafer 50, is connected to a negative voltage source. During electroplating, the electric field within the vessel 38 causes metal ions in the vessel-catholyte to deposit onto the wafer 50, creating a metal layer on the wafer 50.

FIG. 1 shows a design having an inner anode 40 surrounded by a single outer anode 42, although a single anode, or multiple concentric outer anodes may be used. An electric field shaping unit 44 made of a di-electric material may be positioned in the vessel 38 to shape the electric field in the vessel 38. Other designs, such as shown in U.S. Pat. Nos. 8,496,790; 7,857,958 and 6,228,232 may also be used.

Turning now also to FIG. 3, the metal layer plated onto the wafer 50 is formed from metal ions in the vessel-catholyte which move through the vessel-catholyte to the wafer surface due to the electric field in the vessel 38. A vessel-catholyte replenishing system 70 is connected to the vessel 38 to supply metal ions into the vessel-catholyte. The vessel-catholyte replenishing system 70 has a vessel-catholyte return line (a tube or pipe) and a vessel-catholyte supply line 78 connecting a replenisher 74 in a catholyte circulation loop, generally indicated at 80 in FIG. 3. Typically, a vessel-catholyte tank 76 is included in the catholyte circulation loop 80, with the vessel-catholyte tank 76 supplying vessel-catholyte to multiple electroplating processors 20 within a processing system. The catholyte circulation loop 80 includes at least one pump, and may also include other components such as heaters, filters, valves, etc. The replenisher 74 may be in line with the catholyte return, or it may alternatively be connected in a separate flow loop out of and back to the catholyte tank.

Figure 4:
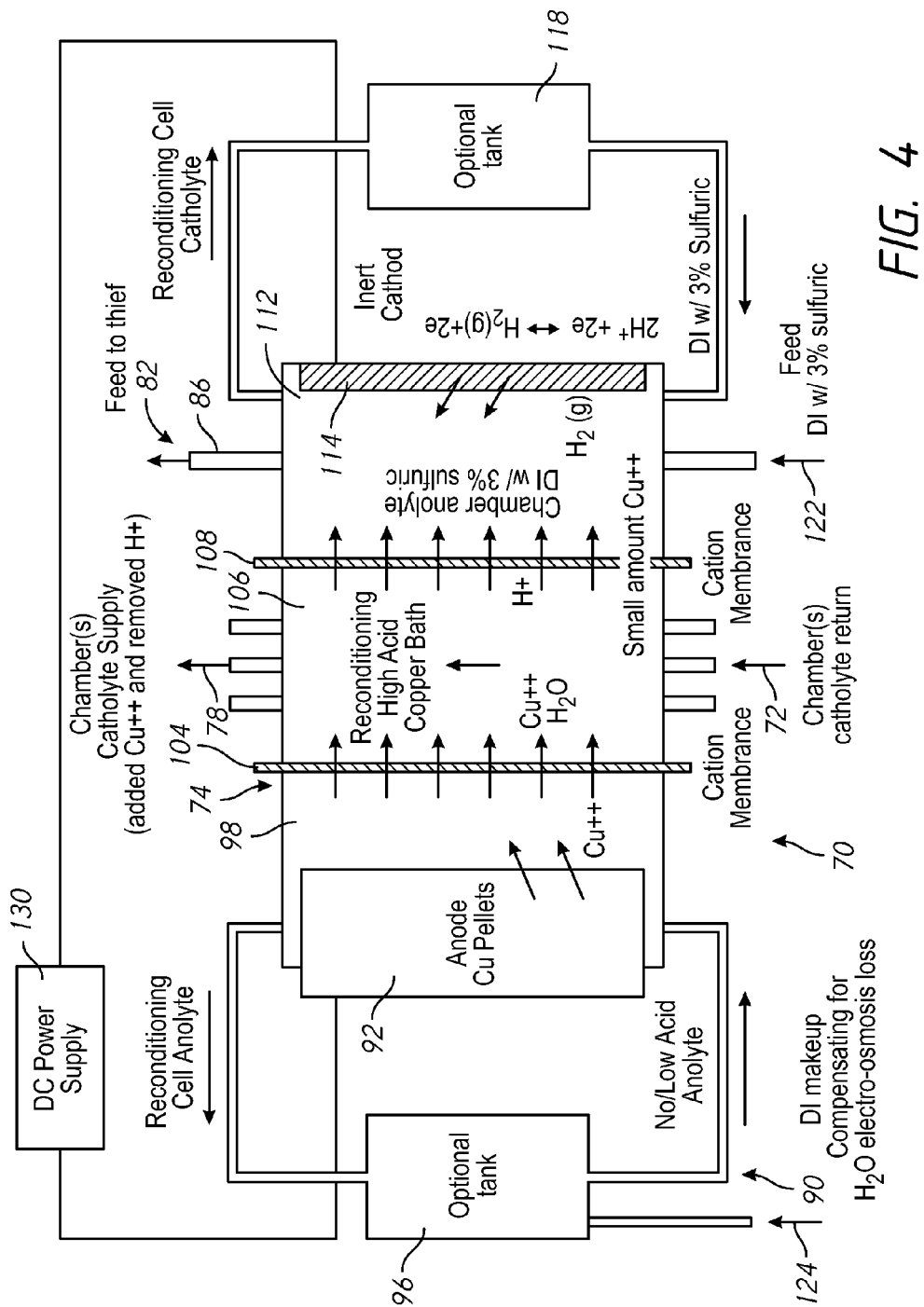
FIG. 4 is an enlarged view of the catholyte replenisher shown in FIG. 3.

FIG. 4 shows an enlarged schematic view of the replenisher 74. A replenisher anolyte circulates within the replenisher 74 through a replenisher anolyte loop 91 including a replenisher anolyte chamber 98 and optionally a replenisher anolyte tank 96. The replenisher anolyte may be a copper sulfate electrolyte with no acid. The anolyte replenisher within the replenisher 74 does not require a recirculation loop and may just consist of an anolyte chamber 98. A gas sparger, for example, nitrogen gas sparger can provide agitation for the replenisher without the complication of a recirculation loop requiring plumbing and a pump. If a low acid electrolyte or anolyte is used, when current is passed across the replenisher, Cu++ ions transport or move across the membrane into the catholyte, rather than protons. Gas sparging may reduce oxidation of bulk copper material.

A de-ionized water supply line 124 supplies make-up de-ionized water into the replenisher anolyte tank 96 or the chamber 98. Bulk plating material 92, such as copper pellets, are provided in the replenisher anolyte chamber 98 and provide the material which is plated onto the wafer 50. A pump circulates replenisher anolyte through the replenisher anolyte chamber 98. The replenisher anolyte is entirely separate from the anolyte provided to the anodes 40 and/or 42.

In an alternative design, an anolyte chamber 98 is used without any replenisher anolyte loop 91. A gas sparger, for example, N2 sparge can provide agitation for the anolyte chamber 98 without using a replenisher anolyte loop. A low acid anolyte insures that when current is passed across the replenisher that Cu++ ions are transported across the membrane into the catholyte rather than protons.

Within the replenisher 74, a first cation membrane 104 is positioned between the replenisher anolyte in the replenisher anolyte chamber 98 and catholyte in a catholyte chamber 106, to separate the replenisher anolyte from the catholyte. The catholyte return line 72 is connected to one side of the catholyte chamber 106 and the vessel-catholyte supply line 78 is connected to the other side of the catholyte chamber 106, to circulate vessel-catholyte from the vessel 38 through the catholyte chamber. Alternately, the catholyte flow loop through the replenisher 74 can be a separate low circuit with the catholyte tank.

The first cation membrane 104 allows metal ions and water to pass through the replenisher anolyte chamber 98 into the catholyte in the catholyte chamber, while otherwise providing a barrier between the replenisher anolyte and the catholyte. Deionized water may added to the vessel-catholyte to replenish water lost to evaporation, but more commonly water evaporation can be enhanced to evaporate the water entering into the vessel-catholyte through electro-osmosis from the anolyte replenisher. An evaporator may be provided for this purpose. The flow of metal ions into the vessel-catholyte replenishes the concentration of metal ions in the vessel-catholyte.

As metal ions in the vessel-catholyte are deposited onto the wafer 50 to form the metal layer on the wafer 50, they are replaced with metal ions originating from the bulk plating material 92 moving through the replenisher anolyte and the first membrane 104 into the catholyte flowing through the catholyte chamber 106 of the replenisher 74. In the example shown the metal ions are copper ions (Cu++) and the vessel-catholyte is a high acid copper electrolyte.

An inert cathode 114 is located in the replenisher chamber 112 opposite from the second cation membrane 108. The negative or cathode of a DC power supply 130 is electrically connected to the inert cathode 114. The positive or anode of the DC power supply 130 is electrically connected to the bulk plating material 92 or metal in the replenisher anolyte chamber 98 applying or creating a voltage differential across the replenisher 74. Replenisher electrolyte in the replenisher chamber 112 may optionally circulate through a replenisher tank 118, with de-ionized water and sulfuric acid added to the replenisher electrolyte via an inlet 122. The replenisher chamber 112 electrolyte may comprise de-ionized water with 1-10% sulfuric acid. The inert cathode 114 may be a platinum or platinum-clad wire or plate. The second ionic membrane 108 helps to retain copper ions in the first compartment.

Referring to FIGS. 1 and 2, the processor 20 may optionally include an electric current thief electrode 46 in the vessel 38, although in many cases no electric current thief is necessary. In this case, the electric current thief electrode 46 may also have an electric current thief wire within an electric current thief membrane tube, similar to the anode 40 or 42 described above. If a thief electrode is used, reconditioning electrolyte may be pumped through the electric current thief membrane tube. The electric current thief wire is generally connected to a negative voltage source which is controlled independently of the negative voltage source connected to the wafer 50 via the contact ring 30.

The electric current thief membrane tube may be connected to a replenisher chamber 112 in the replenisher 74 via a replenisher circulation loop, generally indicated at 82, via a replenisher electrolyte return line 84 and a replenisher electrolyte supply line 86. If used, the high acid catholyte bath in catholyte chamber 106 insures that a high portion of the current crossing membrane 108 is protons rather than metal ions. In this way, the current within the replenisher 74 replenishes the copper within the vessel-catholyte while preventing it from being lost through the membrane.

A second cation membrane 108 is positioned between the catholyte in the catholyte chamber 106 and the replenisher electrolyte in the replenisher chamber 112. The second cation membrane 108 allows protons and small amounts of source metal to pass through from the catholyte in the catholyte chamber 106 into the replenisher electrolyte in the replenisher chamber 112. The primary function of replenisher chamber 112 is to complete the electrical circuit for the replenisher chamber in a way that does not plate metal out onto the inert cathode 114. The replenisher chamber 112 may be used with or without an extra tank or circulation loop.

The high acid electrolyte or catholyte bath in catholyte chamber 106 insures that a high portion of the current crossing membrane 108 is protons rather than metal ions, so that the cathode reaction on the inert cathode 114 is mostly hydrogen evolution. In this way, the current within the replenisher 74 replenishes the copper within the catholyte while preventing it from being lost through membrane 108. This avoids metal build up and electrode maintenance.

In the replenisher, the chamber 112 may be provided without an extra tank or recirculation loop. In the anolyte, nitrogen sparging may be sufficient keeping the plumbing and pumping requirements more simple.

In operation, metal ions in the vessel-catholyte in the vessel deposit onto the wafer 50 to form a metal layer on the wafer 50, via the conducting of electric current from the anodes 40 and 42 to the wafer 50. Vessel-catholyte flows from the vessel into the catholyte chamber 106 in the replenisher 74, where metal ions are added back into the vessel-catholyte, which then returns to the vessel, typically with the catholyte continuously flowing through the catholyte circulation loop 80. The replenisher anolyte also generally flows continuously in the replenisher anolyte loop 91. De-ionized water is added into the replenisher anolyte to make up for water losses in the electro-osmosis of water through the first cation membrane 104. Protons and small amounts of metal ions pass through the second cation membrane 108 into the replenisher electrolyte in the replenisher chamber 112. The vessel-catholyte may be a high-acid wafer level packaging plating electrolyte with additives, as is well known in electroplating technology.

During electroplating, a chemical reaction takes place on the wire surface which converts water into oxygen gas and hydrogen ions (H+). The hydrogen ions which pass through the membrane tube wall and into the chamber catholyte. These ions then become part of the vessel-catholyte that flows to the catholyte chamber 106. The majority of these ions carry current through the membrane 108, where hydrogen ions are removed from the chamber catholyte.

The oxygen gas is exhausted from the membrane tubes via vacuum or venting, or by sparging with nitrogen gas. The process anolyte itself is not otherwise chemically changed during electroplating.

Figure 5:
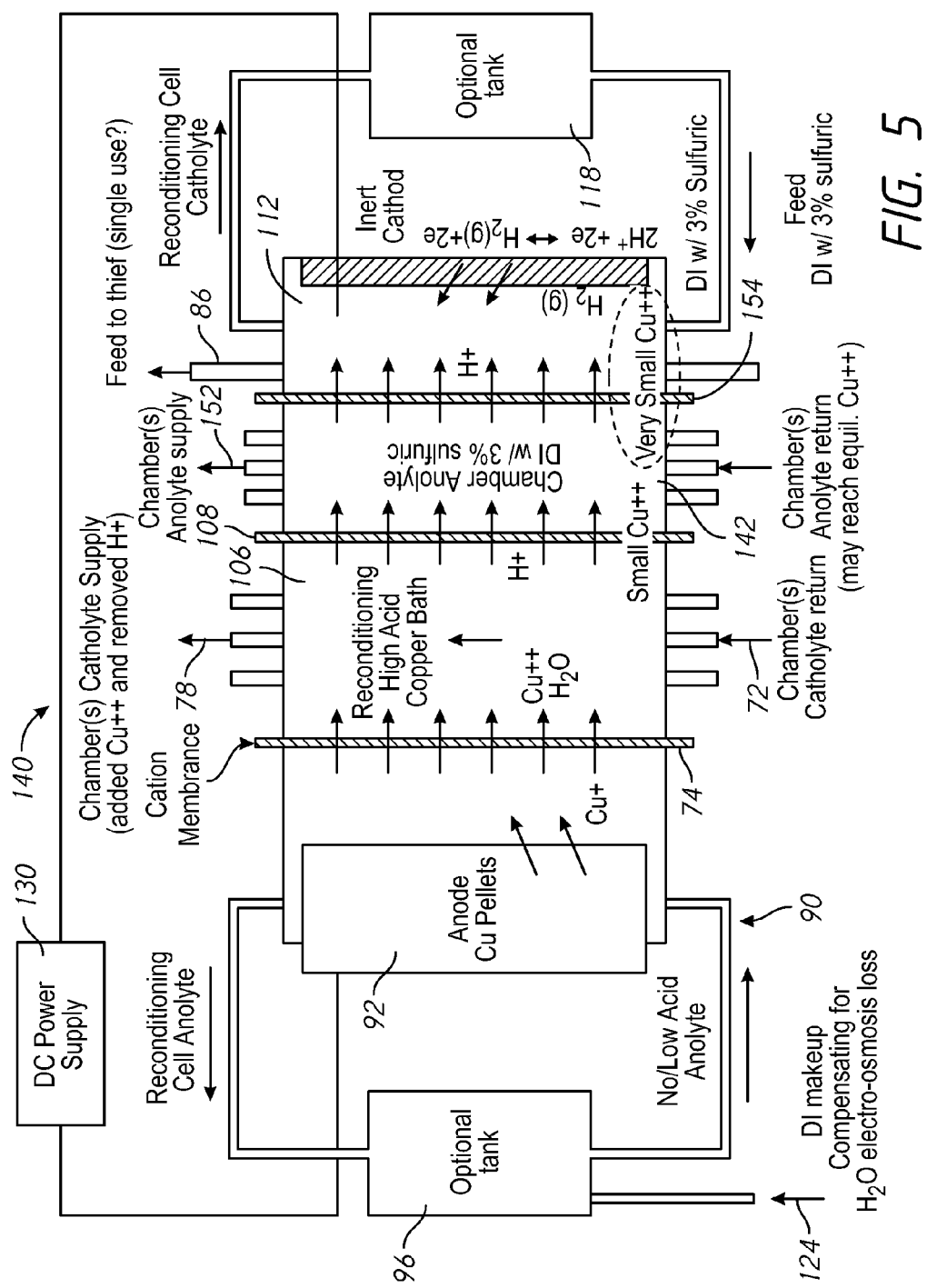
FIG. 5 is a schematic drawing of an alternative vessel-catholyte replenishing system.

FIG. 5 shows an alternative replenisher 140 having a process anolyte chamber 142 connected with the anode membrane tubes of the anodes in an process anolyte flow loop 152. The process anolyte in the process anolyte chamber 142 is separated from the catholyte by the second cation membrane 108 on one side, and by a third cation membrane 154 on the other side of the process anolyte chamber 142. In this design protons and a small amount of metal ions pass through the second cation membrane 108, and protons and a much smaller amount of metal ions pass through the third cation membrane 154.

The extra replenisher anolyte between the high Cu++ catholyte bath in catholyte chamber 106 and the inert cathode 114 further reduces the amount of metal that may reach the inert cathode 114 and plate out on the electrode and require maintenance. It also allows for flowing the anolyte through the replenisher in chamber 142 to use the small amount of copper than may enter the anolyte though membrane 108 and then pass this copper back into the chamber catholyte through the anode tubes. The third cation membrane 154 or the membrane 108 may be replaced with a anion membrane. The extra flowing anolyte through the chamber 142 also allows for a balance in proton exchange between the catholyte and the anolyte. Protons leave the anolyte as current pass through the anode, membrane tubes within the plating chamber, and the protons are replaced across the membrane 108 in the replenishment cell. The copper can pass back into the chamber catholyte through the membrane tubes as current forces cations (i.e. H+ and Cu++) from the anolyte into the chamber catholyte. The embodiment of FIG. 5 may also be designed with the membrane 104 omitted. In this case, an inline replenishment cell has no membrane 104, and the bulk copper is exposed to the chamber catholyte.

During idle state operation, the system is ready but not in actual use. In the idle state, when the replenisher is not in use, the system 170 stops the flow of catholyte over the bulk plating material 92 which forms the consumable anode. Idle state operation avoids osmosis of water across the membrane. Idle state operation also allows for easy access to the consumable anode for maintenance, for example to replace copper pellets as they are consumed. Idle state can be accomplished by stopping flow to the relatively small volume of chamber-catholyte present in the replenisher compared to the large volume of a vessel-catholyte tank of a processing system supplying multiple processors 20. This protects the additives in the vessel-catholyte tank from the exposed metal during long idle times.

In a modified design of FIG. 4, the inert cathode 114 may be placed within a filter, bag or enclosure within the catholyte or replenisher chamber, to reduce mass transfer to the anode and metal plating onto the inert cathode 114. Optionally a resistive screen may be provided on the inert cathode 114 to limit metal plating onto the inert cathode 114. In addition, to prevent metal from depositing onto the inert cathode 114, replenisher electrolyte may be removed and replaced on a schedule. Metal may also be removed from the inert cathode by periodically running the replenisher in reverse (by switching the polarity of the power supply 130) to de-plate the inert cathode, or by using chemical etching.

The membranes 108 and/or 154 may be replaced by an anion membrane to prevent any copper ions moving from the catholyte into the replenisher electrolyte. To operate the replenisher 74 without excessive electrical loading, the chambers 98, 106 and 112 may be narrow, for example with the chambers 106, 112 and 142 (if used) having a width of 3-8 or 4-6 millimeters, and with the chamber 98 having a width of 8-12 millimeters. Chambers having these widths, and a length and a height of about 266 milliliters are calculated to have sufficient capacity for operating a processor electroplating copper onto a 300 millimeter diameter wafer. The chambers may also be cylindrical in a co-axial arrangement. One or two replenishments cells, each with about the area of a 300 mm wafer, are calculated to have sufficient capacity to operate a processing system having with 4-12 electroplating processors 20.

The narrow chamber gaps are helpful to reduce the replenisher voltage and, thus, power supply wattage requirement. The metal pellets in the anolyte chamber 98 can completely fill the chamber and rest against the membrane 74. This keeps the voltage need to flow current to a minimum by limiting the distance from the anode to the membrane. The anolyte bath conductivity is the lowest of all the baths in the system, so there is the most benefit in power supply voltage by minimizing the distance in the current must travel in the anolyte.

Vessel-catholyte as referred to here is the copper (or other metal ion) containing electrolyte. The replenisher anolyte and the replenisher electrolyte may all be the same electrolyte so tanks, plumbing, etc. can be combined in various ways. The process anolyte, replenisher electrolyte, and thiefolyte (if any) may all be the same electrolyte. Also, the process anolyte, replenisher electrolyte, and thiefolyte (if any) may all be all be mixtures of deionized water and sulfuric acid, which are relatively inexpensive.

In the embodiments of FIG. 3-5, an alternative replenisher 90 is presented as a separate device in line with the plating chamber plumping system. The plumbing to the replenisher can optionally be arranged so that the process anolyte also flows through it (i.e. 152 on FIG. 5). However, in other embodiments, the replenisher can be integrated into the vessel-catholyte tank (76 in FIG. 3). Constructing the replenisher in this manner can simplify the system and allow the metal replenishment to be applied directly to the large volume of vessel-catholyte in the main system vessel-catholyte tank. As one specific embodiment, one of the side walls in the vessel-catholyte tank may connect directly to another smaller tank comprising the replenisher anolyte chamber 98. Similarly, the other chambers of the replenisher can be adjacent tanks with common walls including the membranes built into the walls.

The replenisher may be operated to increase the metal concentration in the vessel-catholyte to levels higher than available with consumable anode processors. This operation allows for higher plating rates. This electrochemical method may increase metal concentration to supersaturated levels, further increasing the plating rate and feature morphology. Generally, the replenisher should run at least at the same number of amp-minutes as the plating chamber(s) to insure that the metal concentration in the bath is maintained. However, it is likely than the replenisher amp-minutes may run slightly higher to make up for losses of metal through membrane 108 in the replenisher, or for any other loss than may occur in the system. The replenisher also allows the metal concentration to be increased as already described.

An additional advantage of the replenisher approach is that the consumable anode replenishment is centralized to one location (i.e. the replenisher(s)) rather than at each chamber separately.

Therefore, the invention allows simplified chambers with inert anodes with the same low cost of ownership. Copper replenishment is centralized and can be done without ever taking the tool down for maintenance. This feature results in an increase in uptime.

The terms anode wire, current thief wire, anode membrane tube, current thief membrane tube, catholyte membrane and replenisher electrolyte membrane are descriptors used in the claims only to distinguish the claimed elements from each other, and are not characteristics or material properties of the claimed elements. Indeed, the same wire, membrane tubes, and membranes may be used for these elements. The term wire means an elongated metal element, typically round like a wire, but also including other shapes such as a flat ribbon and plated on, or braided elements.

The operation of the replenisher 74 largely maintains the stability of the vessel-catholyte. Removal and replacement of vessel-catholyte, other than via the catholyte circulation loop, is minimal, as the vessel-catholyte remains stable, except potentially for additive replenishment and limiting the buildup of additive by-products.

Figure 6:
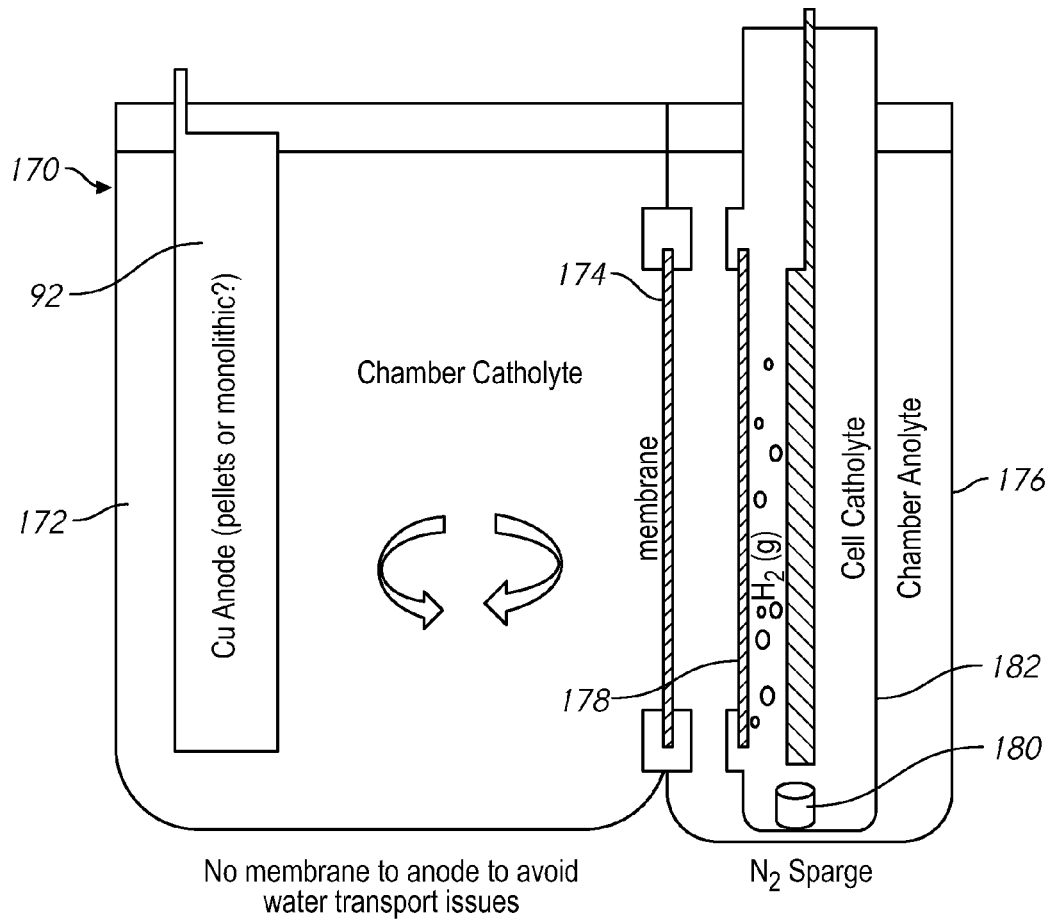
FIGS. 6-10 are schematic drawings of additional alternative vessel-catholyte replenishing systems.

Turning to FIG. 6, an alternative system 170 is similar to the system of FIG. 5 without the anolyte membrane. The vertical orientation of the replenisher catholyte helps to release gas generated during operation. In addition, use of the tanks 172 and 174 with the tank membrane 174 between them avoids the need for extra plumbing as needed in an in-line replenisher. A replenisher membrane 178 separates the process anolyte in the second tank 176 from the replenisher catholyte which is optionally in a third tank 182 within the second tank 176. A gas sparge outlet 180 may release a gas, such as nitrogen, into the third tank 182.

The system of FIG. 6 may increase consumption of vessel-catholyte additives because additives in the vessel-catholyte are able come in contact with the consumable anode. To reduce additive consumption, an idle state operation may minimize the surface area of the consumable anode. In one method of operation, the replenisher is held in idle state until the copper (or other anode material) in the vessel-catholyte reaches the lower limit of the copper concentration control limit. The replenisher then is put in operation at a higher rate than what the system is consuming to replenish the copper in the vessel-catholyte. When the upper control limit of copper is reached, the replenisher 190 may be turned off and put back into idle state operation.

Figure 7:
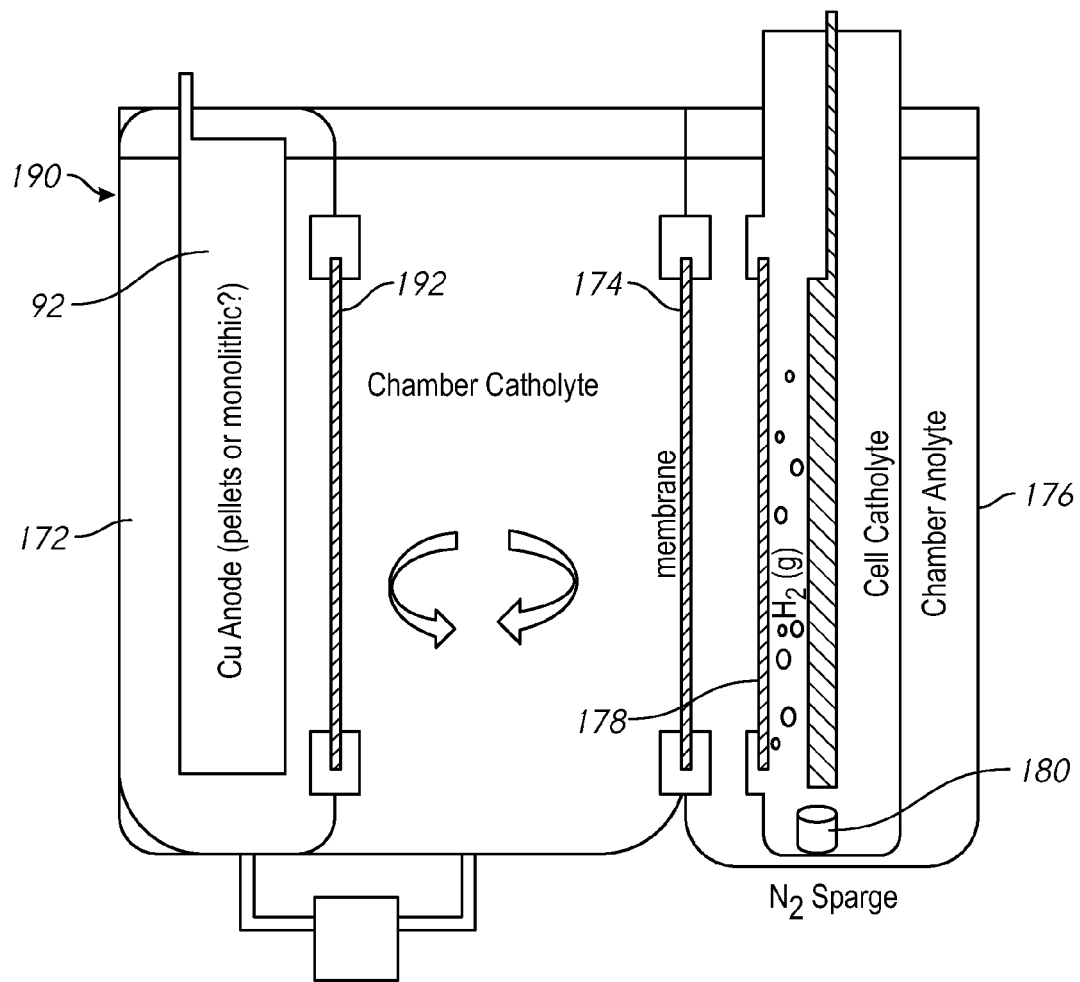

FIG. 7 shows a system which may be the same as FIG. 6, but further including a divider membrane for the anode, and having a common catholyte. In the idle state when the replenisher is not operating, the recirculation from the vessel-catholyte tank to the anode section can be turned off. When the recirculation is on, the electrolyte bath makeup on both sides of the 192 membrane is kept uniform and water build-up may be avoided.

Figure 8:
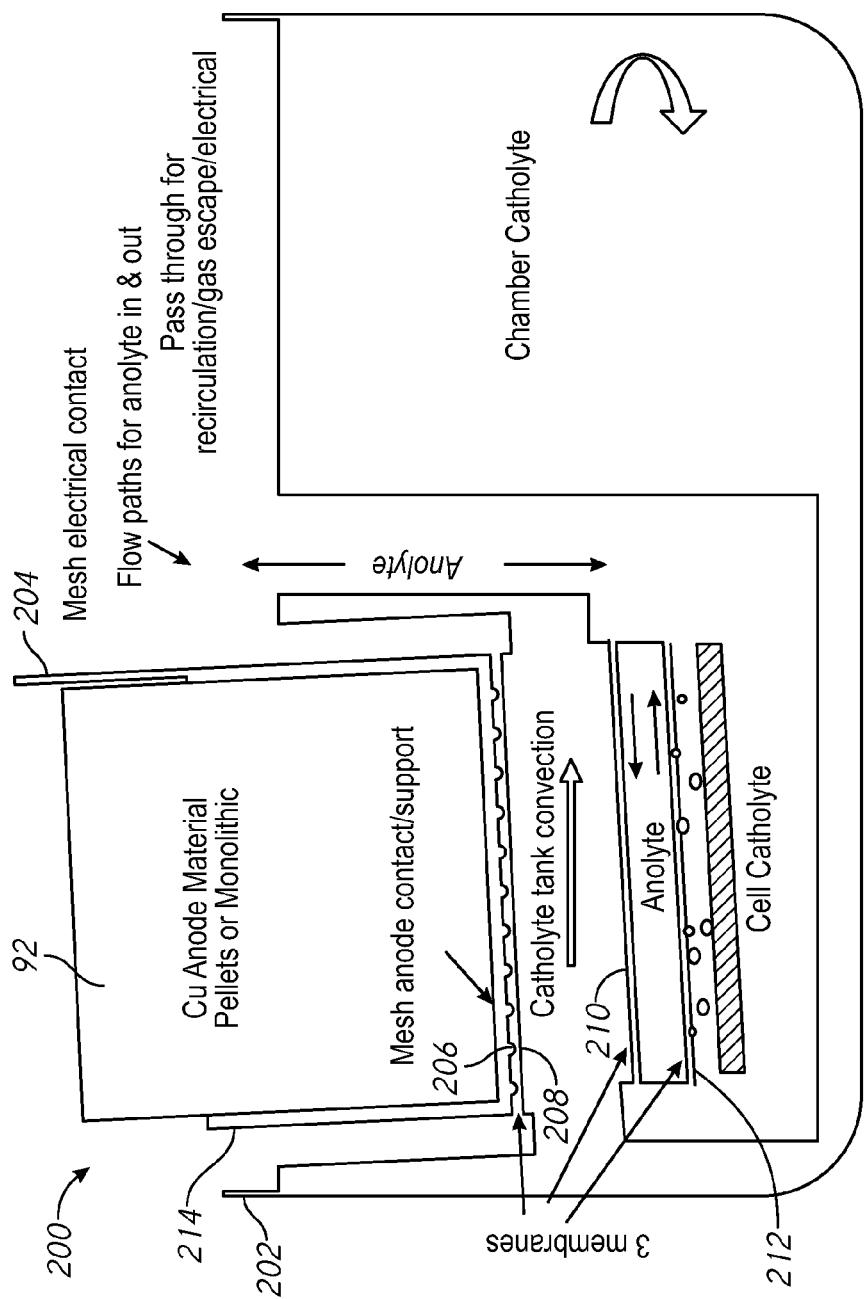

FIG. 8 shows a system 200 having a vessel-catholyte tank 202 which holds vessel-catholyte for use by multiple electroplating processors 20. A mesh anode support 204 is positioned under the copper anode. A mesh contact 206 is electrically connected to the mesh anode support and connects to the power supply 130. The copper anode and the mesh anode support 204 are held within a holder 214 in the vessel-catholyte tank 202. A contact membrane 208 separates the electrolyte around the copper anode from the chamber catholyte. Anolyte flow within the tank 202 is separated from the chamber catholyte in the tank 202 via an upper membrane 210 and a lower membrane 212. The membranes 208, 210 and 212 may be horizontal, or within 10 degrees of horizontal.

Figure 9:
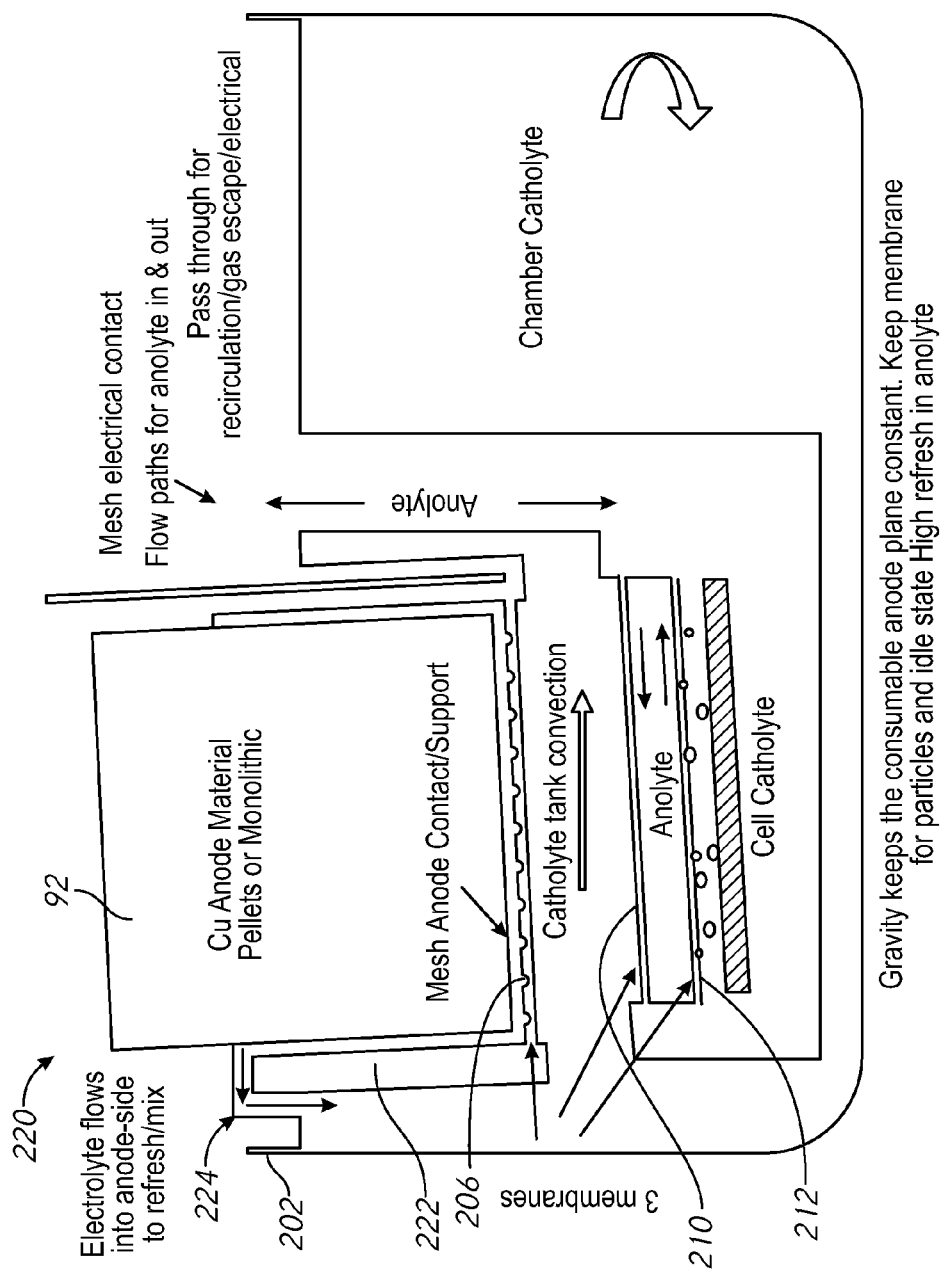
Figure 10:
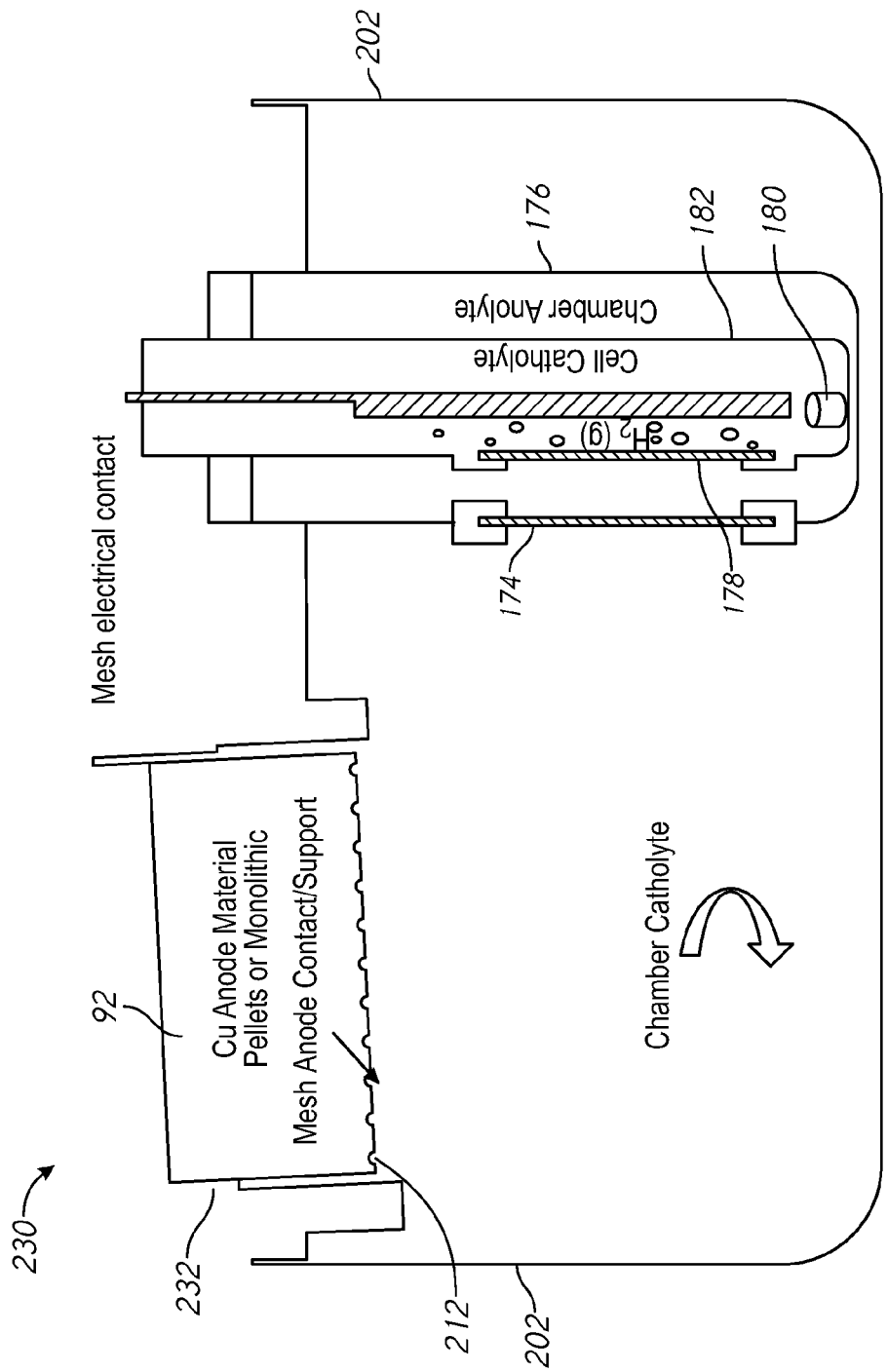

Current flow in the replenisher causes erosion of the consumable anode material or the bulk copper material. Using a near horizontal orientation may reduce erosion of the consumable anode material, e.g., copper. The anolyte compartment is on the top and gravity keeps the copper material at the same distance from the membrane at all times as the copper erodes. The anode compartment may be completely open to atmosphere for easy access. Positioning the replenisher within the system vessel-catholyte tank 202 reduces plumping connections and components. FIGS. 8-10 generally show a first tank in, or submerged within an internal tank or second tank. Where these designs are used, plumbing may be provided to allow mixing of the of the contents of the first tank and the second tank, and independent draining of the first compartment for idle state operation, to lessen consumption of additives. Erosion of the consumable anode is associated with a flow of hydrogen ions across the second membrane to retain copper ions in the first compartment and reduce copper ion transport into the second compartment, and the flow hydrogen ions cross the second membrane reduces the transport of copper ions into the third compartment, to reduce copper deposition onto the inert cathode.

FIG. 9 shows a system 220 similar to FIG. 8 but with a holder 222 modified to create a flow path 224 which allows electrolyte around the copper anode to flow up and out of the holder and into the chamber catholyte in the tank 202. In this system, the flow into the replenisher containing the anode can be stopped to put the replenisher into the idle state. The first compartment, or others, may have independent draining for idle state operation, to lessen consumption of additives.

FIG. 10 shows a system 230 similar to FIGS. 8 and 9 and having a holder 232 which is open to the chamber catholyte in the tank 202, and using the third tank 182 and the replenisher membrane 178 as shown in FIGS. 6 and 7. A three compartment system may be designed as in FIG. 5, but without the membrane 74 (and without the optional replenisher anolyte tank 96) allowing the copper pellets to contact the chamber catholyte and avoid water osmosis. An in-line system like FIG. 5, but without the membrane 74 can be placed in idle state by stopping flow of the chamber catholyte through the in-line replenisher. This would protect the additives in the large chamber catholyte tank from the bulk anode material or bulk copper.

The systems described above may have only have three compartments. For example, the replenisher anolyte/chamber catholyte membrane may be omitted. This avoids water accumulation in the vessel-catholyte which is a very challenging problem for high amp-min processes. An isolyte section may also be omitted, with anolyte flow to the process chambers in a completely separate tank/flow path. The effects of more Cu++ ions getting to the replenisher cathode may be reduced by cathode maintenance and/or bleed and feed.

As described, the replenisher may be placed in the vessel-catholyte tank for the tool. This avoids pumping/plumbing vessel-catholyte to the replenisher. In this design the replenisher may have a first section or frame comprising the replenisher anode compartment. The second section or frame holds the anolyte and replenisher catholyte. Placed adjacent to each other with a gap allowing the vessel-catholyte to pass between completes the replenisher and refreshes the copper in the tank. If there is no anolyte membrane in the replenisher, then copper can be placed directly into the system vessel-catholyte tank adjacent to the half-replenisher comprised of the anolyte/catholyte compartments. When using copper pellets as the anode, the pellets may entirely fill the compartment, and even touch the membrane, to minimize the replenisher voltage drop, and simplify the restocking of the consumable anode material.

The systems described may also be designed with the wafer held vertically rather than horizontally. The membranes are ionic membranes.

The current flow across the cationic membrane is carried by the positive ions in the bath on the upstream (with respect to the ionic current flow) side of the membrane. In copper acid baths, these are copper ions and hydrogen ions. The total current is the sum of the partial current carried by the copper ions and the partial current carried by the hydrogen ions. A low acid bath has very few hydrogen ions and so the copper ion partial current is very high (e.g., in the first compartment). A high acid bath contains a high concentration of hydrogen ions. As these ions are much more mobile than the copper ions, the hydrogen ion partial current is very high. The hydrogen ion partial current may be greater than 90% of the total current across the membrane. Correspondingly, the copper ion partial current may be less than 10% of the total current flow across the membrane. Ideally, the current across the second membrane is all hydrogen ions so that are copper replenishment efficiency is 100%. However, if this is not the case, then the replenishment cell current might need to be increased or bleed and feed might be needed in order to compensate for the lower copper replenishment efficiency. A pumped or forced flow through the different compartments may be used in addition to or instead of the use of gas sparging, as at high currents, Joule heating may require forced flow through the compartments avoid temperature increases.

Thus, novel apparatus and methods have been shown and described. Various changes and substitutions may of course be made without departing from the spirit and scope of the invention. The invention, therefore, should not be limited except by the following claims and their equivalents.

The invention claimed is:

1. A copper electroplating system comprising:
   at least one electroplating vessel with at least one inert anode in contact with a process anolyte in a process anolyte compartment of the vessel, the at least one inert anode including process anolyte within at least one anode membrane tube;
   a head for holding a wafer with a conductive seed layer in contact with a vessel-catholyte containing copper ions in a vessel-catholyte compartment of the vessel, with the wafer in a non-vertical orientation;
   a current thief membrane tube in the process anolyte in the vessel and positioned to flow thief current around the wafer, the current thief membrane tube containing thiefolyte;
   a contact ring having electrical contacts for making electrical contact to the conductive seed layer and for sealing to the wafer;
   a first voltage source connecting the at least one inert anode to the conductive seed layer, with the first voltage source causing electrical current to flow between the anode and the conductive seed layer, which causes a conversion of water at the inert anode into oxygen gas and hydrogen ions and the deposit of copper ions from the vessel-catholyte onto the wafer;
   a second voltage source connecting to the thiefolyte in the current thief membrane tube, the second negative voltage source controllable independently of the first positive voltage source, the second negative voltage source reducing current density at the edge of the wafer;

an external three-compartment processor for replenishing the vessel-catholyte, including:
  a first replenisher compartment having supply and return lines to the vessel-catholyte compartment in the vessel, the first replenisher compartment containing bulk copper material and vessel catholyte;
  a second replenisher compartment having supply and return lines to the process anolyte compartment in the vessel, the second replenisher compartment containing process anolyte and separated from the first replenisher compartment by a first membrane;
  a third replenisher compartment having supply and return lines to the current thief membrane tube, the third replenisher compartment containing an inert cathode and thiefolyte, the third replenisher compartment separated from the second replenisher compartment by a second membrane; and
  a third voltage source connecting the bulk copper material to the inert cathode, with the third voltage source controllable independently of the first voltage source and the second voltage source, the third voltage source causing electrical current to flow between the inert cathode and the conductive seed layer, which causes erosion of bulk copper material into copper ions that replenish the vessel-catholyte.

2. The system of claim 1 with the contact ring moveable vertically to engage contact fingers on the contact ring onto a down facing surface of a wafer.

3. The system of claim 1 further wherein the inert anode comprises an inert wire inside an anode membrane tube containing the process anolyte.

4. The system of claim 1 further including a current thief wire inside of the current thief membrane tube.

5. The system of claim 1 with the inert cathode material comprising a platinum clad wire mesh or plate.

6. The system of claim 1 further including a nitrogen sparging outlet in the third compartment for agitation and dilution of hydrogen gas.

7. The system of claim 1 further including a nitrogen sparging outlet in the first compartment for agitation and reduced oxidation of bulk copper material.

8. The system of claim 1 further including a nitrogen sparging outlet in the second compartment for agitation.

9. The system of claim 1 further including a deionized water source connected to the second compartment.

* * * * *